(12) United States Patent
Chi (10) Patent No.: US 6,860,551 B1
(45) Date of Patent: Mar. 1, 2005

(54) SADDLE STRUCTURE FOR VEHICLES

(76) Inventor: Hsien Yao Chi, No. 50, King-Men St., Lu Kang Chen, Changhua Hsien (TW)

( * ) Notice: Subject to any disclaimer, the term of this patent is extended or adjusted under 35 U.S.C. 154(b) by 0 days.

(21) Appl. No.: 10/766,833

(22) Filed: Jan. 30, 2004

(51) Int. Cl.$^7$ .................................................. B62J 1/26
(52) U.S. Cl. ........................ 297/200; 297/199; 297/214
(58) Field of Search ................................ 297/214, 202, 297/200, 199, 195.1, 452.41

(56) References Cited

U.S. PATENT DOCUMENTS

| | | | | | |
|---|---|---|---|---|---|
| 566,344 | A | * | 8/1896 | Sager | 297/200 |
| 611,377 | A | * | 9/1898 | Davis | 297/200 |
| 718,850 | A | * | 1/1903 | Kruseman | 297/199 |
| 5,108,076 | A | * | 4/1992 | Chiarella | 297/214 |
| 5,348,369 | A | * | 9/1994 | Yu | 297/214 |
| 5,720,518 | A | * | 2/1998 | Harrison | 297/214 |
| 5,904,396 | A | * | 5/1999 | Yates | 297/214 |
| 5,911,475 | A | * | 6/1999 | Nakahara | 297/219.11 |
| 6,095,601 | A | * | 8/2000 | Yu | 297/215.16 |

* cited by examiner

*Primary Examiner*—Milton Nelson, Jr.
(74) *Attorney, Agent, or Firm*—Troxell Law Office PLLC (57) ABSTRACT

A saddle structure for vehicles includes a saddle, a spongy mass mounted on top of the saddle thereof, and an outer leather layer wherein the spongy mass has an elastic reinforcing area disposed therein which, designed according to the ergonomics, is made up of two annular suspended cavities symmetrically dented at both lateral sides thereon and a linkage support groove to bridge the two suspended cavities at the middle section thereof, properly fitting to the position of the hipbones and the cleft of the buttocks of human body respectively. The outer leather layer is tightly bound at the upper surface of the spongy mass without the elastic reinforcing area thereof in direct contact with the surface of the saddle to form an enclosed and elastic empty space there-between. Thus, when a rider sits on the saddle thereof, the hipbones and the cleft of the buttocks of the rider are precisely located onto the elastic reinforcing area which is flexibly dented in a radian relative to that of the hipbones to figure a suspended and elastic arc effect thereof without causing any strains or pains to the rider so that the rider can sit comfortably on the saddle in long rides or on bumpy roads while the saddle thereof is maintained in proper softness and flexibility with a shock-absorbing effect as well to achieve the best riding condition.

18 Claims, 10 Drawing Sheets

SADDLE STRUCTURE FOR VEHICLES

BACKGROUND OF THE INVENTION

The present invention is related to a saddle structure for vehicles, including a saddle, a spongy mass mounted on top of the saddle thereof, and an outer leather layer wherein the spongy mass has an elastic reinforcing area preset therein which, designed according to the ergonomics, is made up of two annular suspended cavities and a linkage support groove, properly fitting to the position of the hipbones and the cleft of the buttocks of human body respectively; whereby, when a rider sits on the saddle thereof, the hipbones and the cleft of the buttocks of the rider are precisely located onto the elastic reinforcing area which is flexibly dented in a radian relative to that of the hipbones to figure a suspended and elastic arc effect thereof without causing any strains to the rider so that the rider can sit comfortably on the saddle in long rides or on bumpy roads while the saddle thereof is maintained in proper softness and flexibility with a shock-absorbing effect as well.

A conventional saddle structure for vehicles is provided with a spongy mass directly housed at a saddle and an outer leather layer there-between. Once the outer leather layer is tightly bound at the spongy mass thereon, the elasticity thereof is equally distributed on the saddle as a whole. When a rider sits on the saddle, the hipbones thereof are directly abutted against the upper surface at the rear side of the saddle without any reinforcing design thereon according to the ergonomics of human body. Thus, in long rides or on bumpy roads, the conventional saddle tends to cause strains or pains in the hipbones to the rider seated uncomfortably thereon.

SUMMARY OF THE PRESENT INVENTION

It is, therefore, the primary purpose of the present invention to provide a saddle structure for vehicles, including a saddle, a spongy mass mounted on top of the saddle thereof, and an outer leather layer wherein the spongy mass has an elastic reinforcing area preset therein which is made up of two annular suspended cavities and a linkage support groove, properly fitting to the position of the hipbones and the cleft of the buttocks of human body respectively; whereby, when a rider sits on the saddle thereof, the hipbones and the cleft of the buttocks of the rider are precisely located onto the elastic reinforcing area which is flexibly dented in a radian relative to that of the hipbones thereof to figure a suspended and elastic arc effect so that the rider can sit comfortably on the saddle in long rides or on bumpy roads while the saddle thereof is maintained in proper softness and flexibility with a shock-absorbing effect as well.

It is, therefore, the secondary purpose of the present invention to provide a saddle structure for vehicles wherein the elastic reinforcing area of the sponge element can also have an air bag element adapted therein to provide elastic support thereby. Thus, the elastic reinforcing area of the spongy mass thereof is smoothly arced relative to that of the hipbones of a rider, facilitating a better suspended and elastic radian without causing any strains or pains to the rider, properly fitting to the ergonomics of human body.

DETAILED DESCRIPTION OF THE PREFERRED EMBODIMENTS

Figure 1:
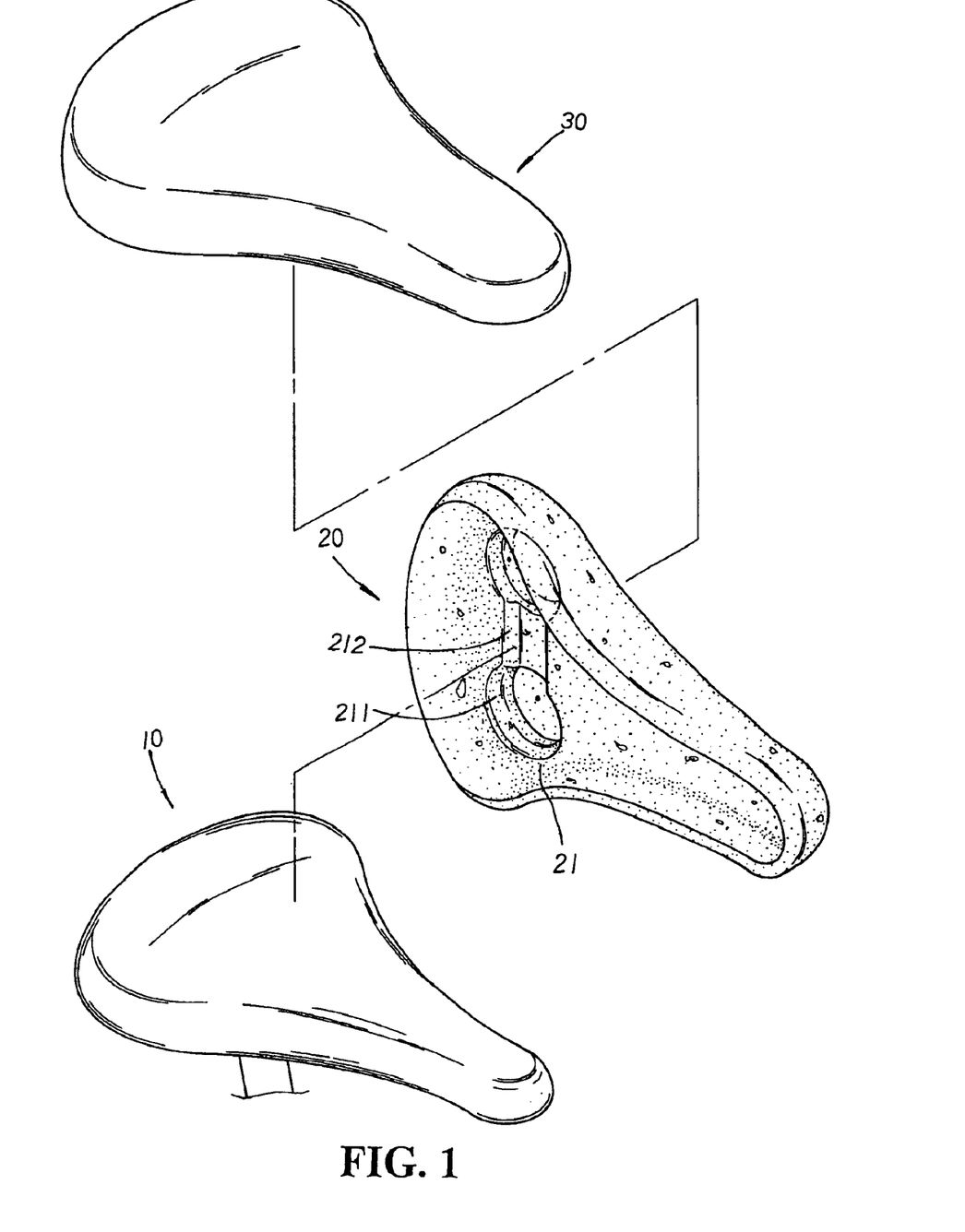
FIG. 1 is a perspective exploded view of the present invention.
Figure 2:
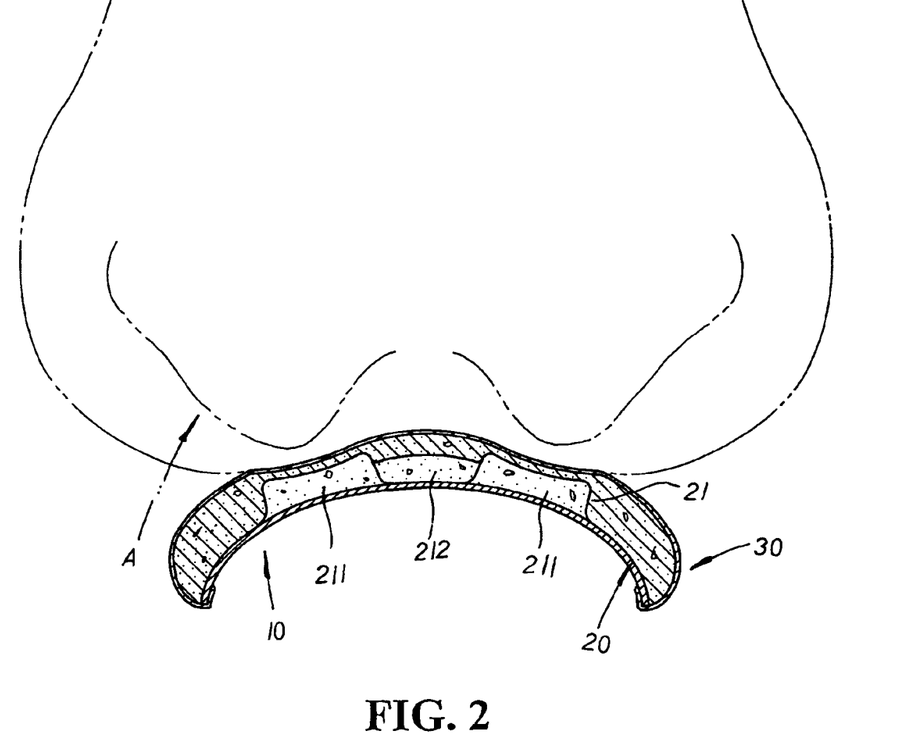
FIG. 2 is a diagram showing a saddle structure of the present invention seated thereon in practical use.

Please refer to FIGS. 1 to 2 inclusive. The present invention is related to a saddle structure for vehicles, including a saddle 10, and a spongy mass 20 mounted on top of the saddle 10 thereof. At the bottom side of the spongy mass 20 thereof is preset an elastic reinforcing area 21 which, designed according to the ergonomics, is made up of two annular suspended cavities 211 symmetrically dented at both lateral sides thereon and a linkage support groove 212 to bridge the two suspended cavities 211 at the middle section thereof, properly fitting to the position of the hipbones A and the cleft of the buttocks of human body respectively. An outer leather layer 30 is tightly bound and coated at the upper surface of the spongy mass 20 without the elastic reinforcing area 21 thereof in direct contact with the surface of the saddle 10 thereof to form an enclosed elastic space there-between. When a rider sits on the saddle 10 thereof, the hipbones A and the cleft of the buttocks of the rider are precisely located onto the two suspended cavities 211 and the linkage support groove 212 of the elastic reinforcing area 21 thereof respectively. The two suspended cavities 211 are simultaneously pressed downwards by the hipbones A of the rider to equally bear the weight and form an empty space at the elastic reinforcing area 21 therein. Thus, the two suspended cavities 211 are elastically dented downwards in a radian relative to that of the hipbones A thereof to figure a suspended and elastic arc effect thereof, avoiding the uncomfortable situation of the conventional saddle structure when the hipbones A are directly abutted against the saddle. No matter in long rides or on bumpy roads, the rider can sit comfortably on the saddle 10 while the elastic reinforcing area 21 of the saddle 10 is maintained in proper softness and elasticity to achieve the best riding condition thereof.

Figure 3:
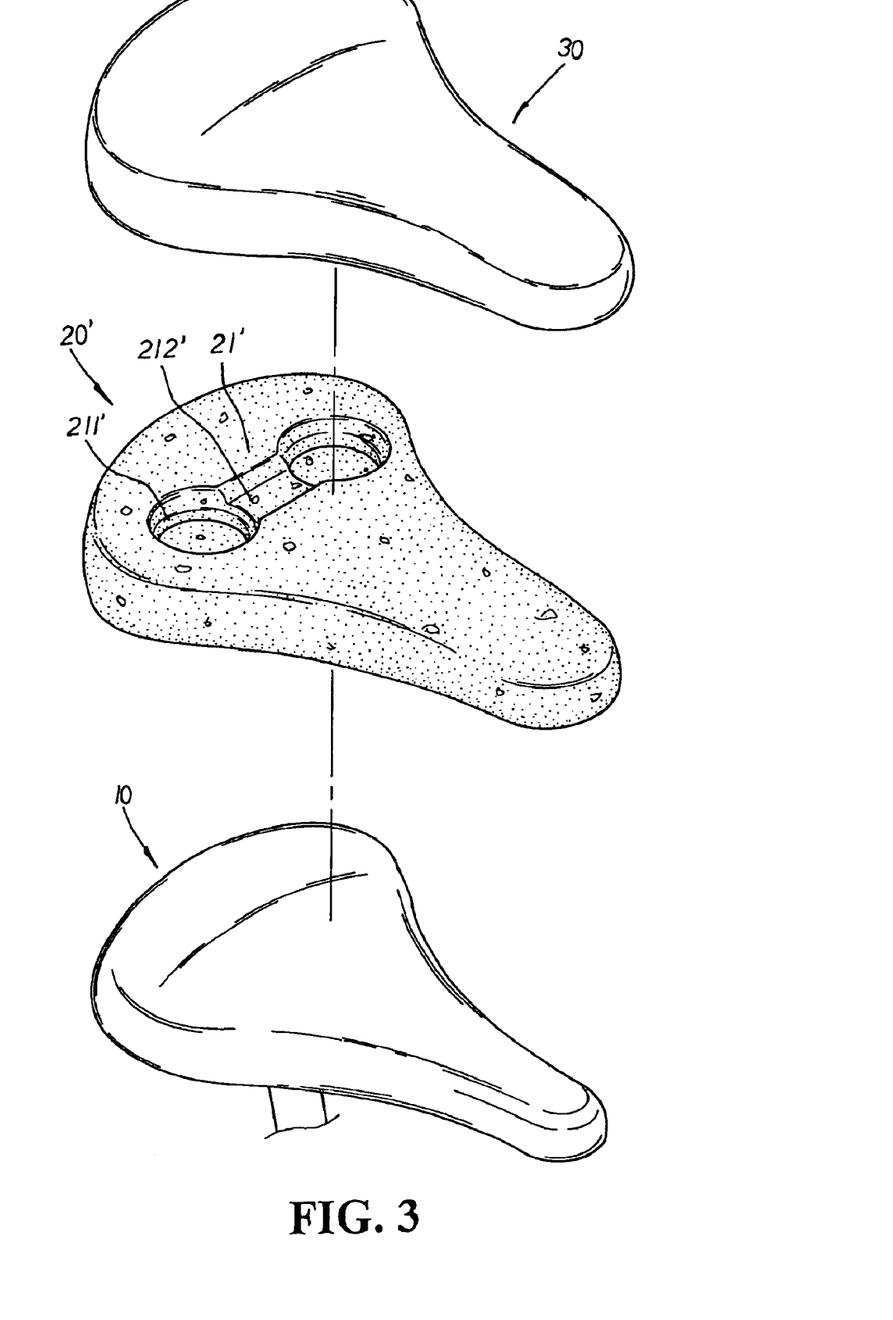
FIG. 3 is a perspective exploded view of another embodiment of the present invention.

Please refer to FIG. 3. The present invention can also have a spongy mass 20', and an elastic reinforcing area 21' with two suspended cavities 211' and a linkage support groove 212' disposed thereon wherein the elastic reinforcing area 21' thereof is properly preset at the upper surface of the spongy mass 20' thereof, and the outer leather layer 30 is coated at the upper surface of the spongy mass 20' to form an enclosed and elastic empty space at the elastic reinforcing area 21' therein.

Figure 4:
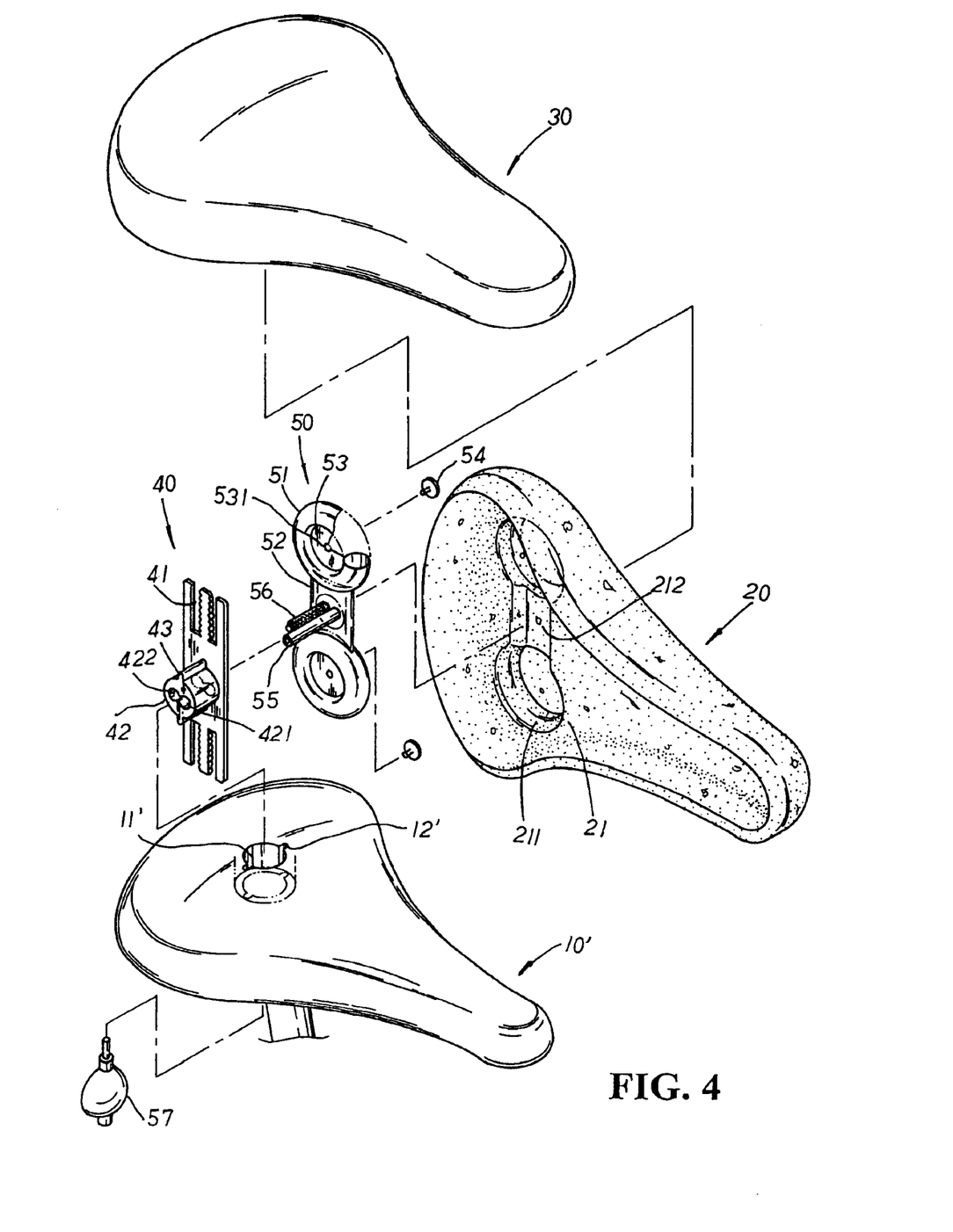
FIG. 4 is a perspective exploded view of a third embodiment of the present invention.

Please refer to FIG. 4. A third embodiment of the present invention includes a saddle 10', a spongy mass 20 with an elastic reinforcing are 21, an outer leather layer 30, a locating member 40, and an air bag element 50. The saddle 10' has a through rod 11' extending downwards at preset spot thereof with a pair of vertical recesses 12' symmetrically cut at the inner wall of the through rod 11' thereon. The locating member 40 thereof is provided with a pair of wavy adjustment slots 41 symmetrically defining each lateral side thereof respectively, a sleeve rod 42 protruding at the middle section of one surface thereon, a pair of mutually connected left/right limiting holes 421, 422 disposed at the center of the sleeve rod 42 there-through, and a pair of locating ribs 43 symmetrically protruding at the outer wall of the sleeve rod 42 thereof. The air bag element 50, shaped like the elastic reinforcing area 21 of the spongy mass 20, is made up of two annular air bags 51 symmetrically disposed at both sides thereof, and an inflation zone 52 communicating with the two annular air bags 51 at the middle section thereof. At the center of each annular air bag 51 is disposed a linking support facet 53 having a through hole 531 disposed thereon correspondingly matched to an adjusting button 54. An inflation nozzle 55 and an air release nozzle 56 are respectively protruding at one side of the inflation zone 52 wherein the inflation nozzle 55 is matched to an pneumatically-Operated inflation valve 57 as that used measuring blood pressure.

Figure 5:
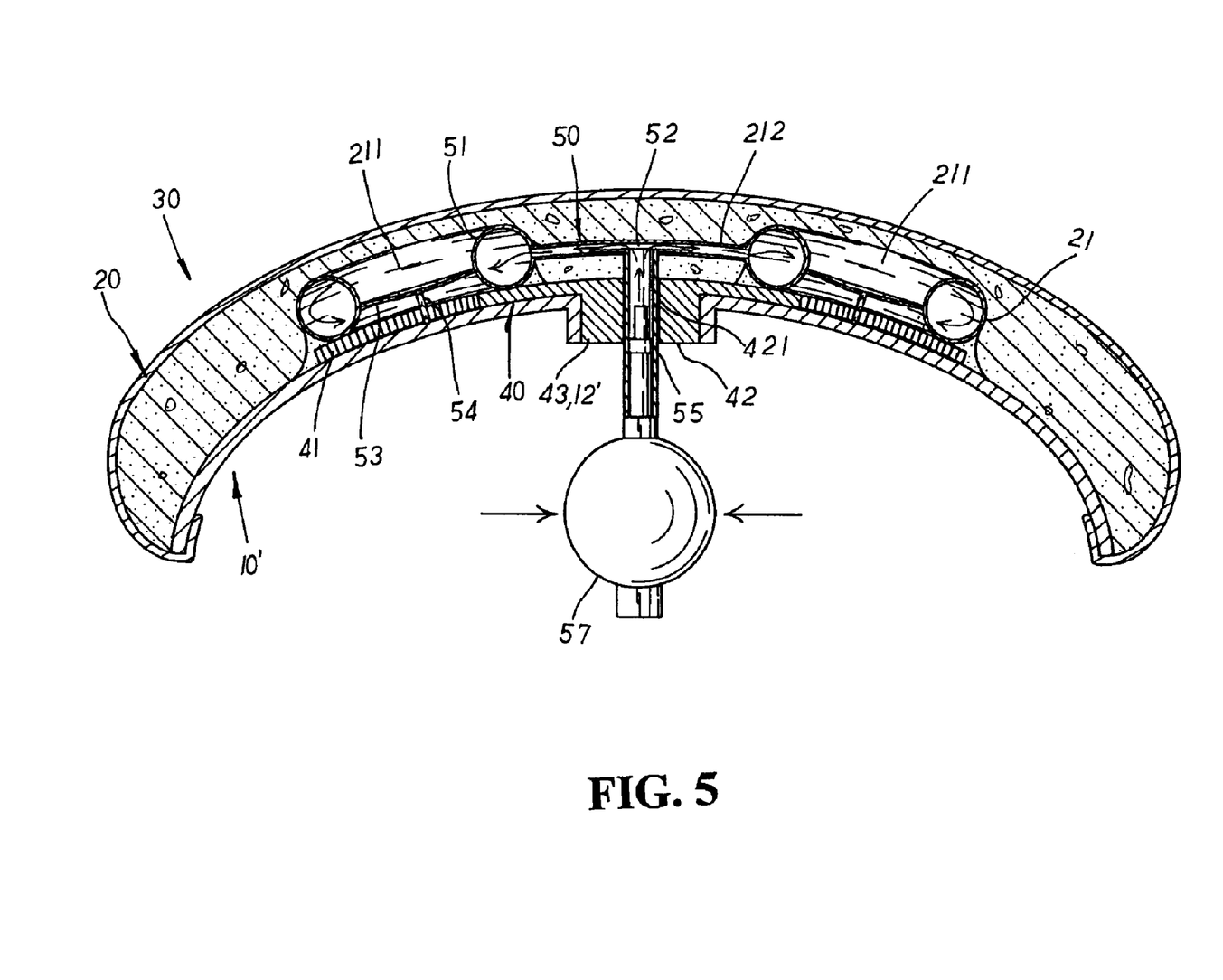
FIG. 5 is a cross sectional view of the third embodiment of the present invention in assembly.

Please refer to FIG. 5. In assembly, the sleeve rod 42 of the locating member 40 is led from top to bottom to be joined to the through rod 11' of the saddle 10' with the locating ribs 43 thereof engaged with the vertical recesses 12' thereof respectively to abut the locating member 40 precisely on top of the saddle 10' in secure location thereby. The inflation nozzle 55 and the air release nozzle 56 of the air bag element 50 are led downwards to pass through the two limiting holes 421, 422 respectively, and the adjusting buttons 54 engaged with the through holes 531 of the linking support facets 53 thereof are pressed downwards to be registered with the adjustment slots 41 of the locating member 40 thereof. The elastic reinforcing area 21 of the spongy mass 20 is correspondingly matched to the air bag element 50 and mounted downwards onto the saddle 10' thereof with the two air bags 51 thereof retained at the suspended cavities 211 therein respectively and the inflation zone 52 thereof abutted against the bottom side of the linkage support groove 212 thereof. The outer leather layer 30 is then coated at the upper surface of the spongy mass 20, and the inflation valve 57 fixedly joined to the inflation nozzle 55 to complete the assembly of the third embodiment of the present invention.

In practical use, the inflation valve 57 is repeatedly pressed to pump air into the air bags 51 via the inflation zone 52 thereof till the air bags 51 are fully inflated at the elastic reinforcing area 21 therein and flexibly abut against the bottom side of the suspended cavities 211 thereof. Sustained by the air bag element 50 thereof, the elastic reinforcing area 21 of the spongy mass 20 can be smoothly dent in a radian relative to that of the hipbones A to figure a better suspended and elastic arc effect thereof without causing any strains or pains to the rider seated at the saddle 10' thereon, efficiently fitting to the ergonomics of human body. In case the air bag element 50 is overly inflated, the air release nozzle 56 is pressed to let out the air so that the saddle 10' is maintained in a condition of proper softness and flexibility with a shock-absorbing effect as well.

Figure 6:
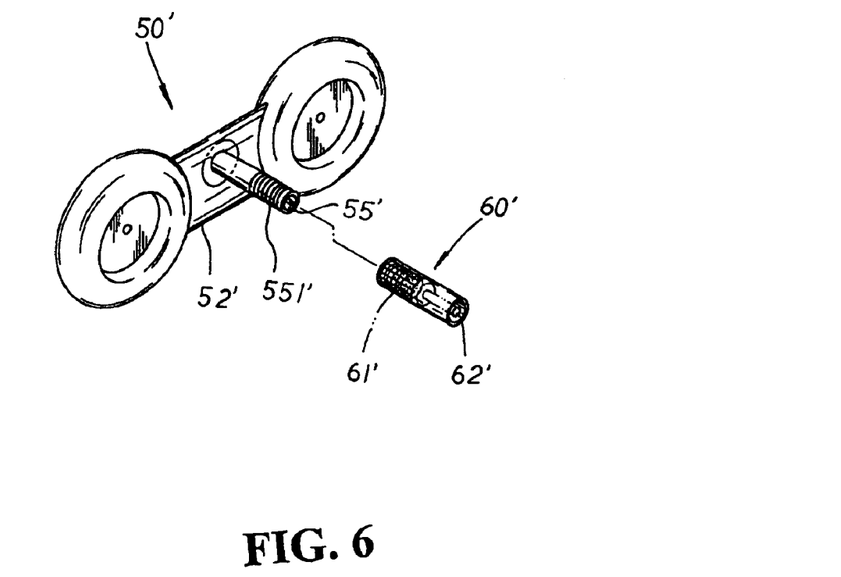
FIG. 6 is a diagram showing another air bag element of the third embodiment of the present invention.

Please refer to FIG. 6. The present invention can also have an air bag element 50' with an inflation zone 52' wherein at one side of the inflation zone 52' thereof is disposed an inflation nozzle 55' (as that used for an inner tube) having an external threaded section 551' defined at one end thereon to be registered with a threaded fixing hole 61' of a sleeve mouthpiece 60' thereby. At the other inner side of the sleeve mouthpiece 60' is protruded an air release needle valve 62' which is pushed to abut against the inner side of the inflation nozzle thereof to let out the air contained at the air bag element 50' therein.

Figure 7:
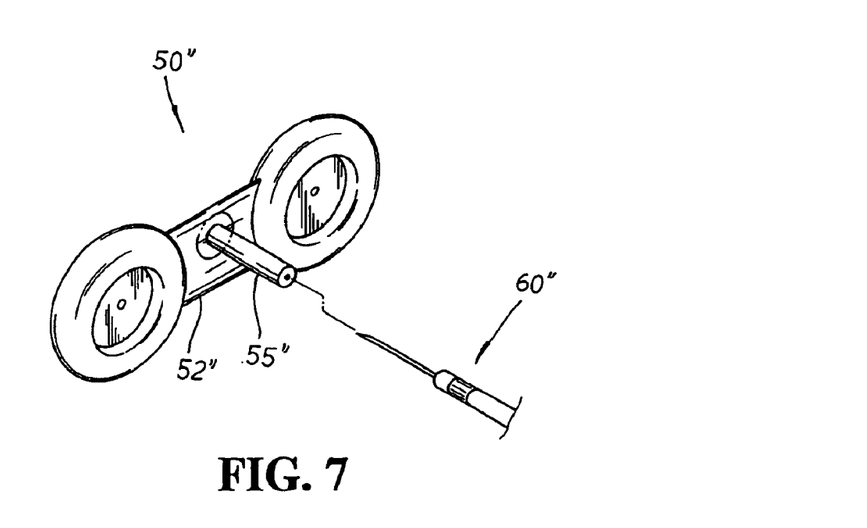
FIG. 7 is a diagram showing a third air bag element of the third embodiment of the present invention.

Please refer to FIG. 7. The present invention can also include an air bag element 50" with an inflation zone 52 having an inflation nozzle 55" protruding at one side thereon to be correspondingly matched to a needle-like inflation valve 60" (as that used for balls).

Figure 8:
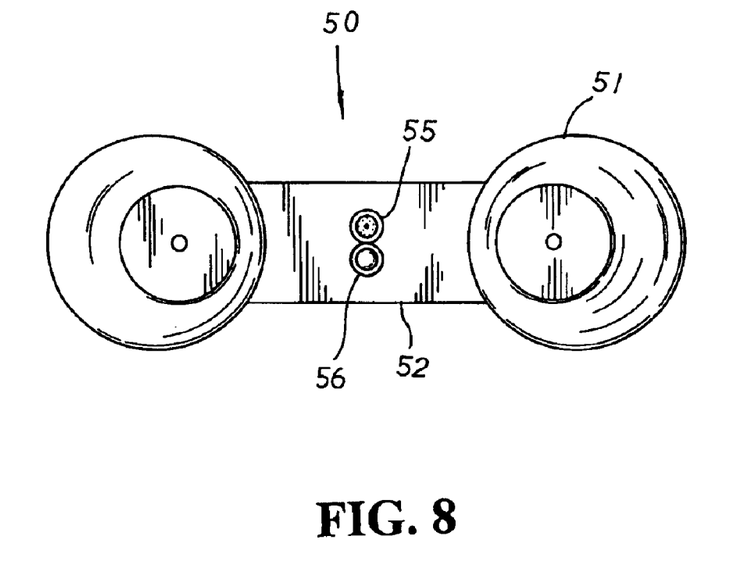
FIG. 8 is a diagram showing a fourth air bag element of the third embodiment of the present invention.

Please refer to FIG. 8. The air bags 51 of the air bag element 50 of the present invention can be eccentrically shaped to fit to the position of the hipbones A and the size of human body according to the ergonomics.

Figure 9:
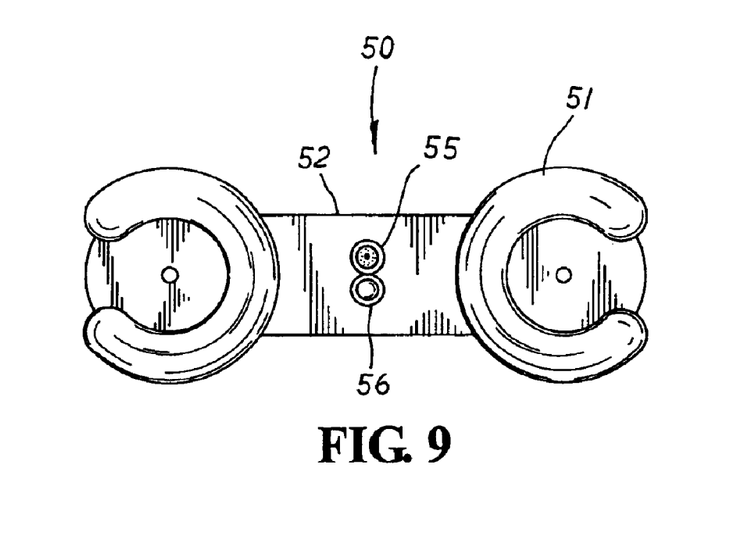
FIG. 9 is a diagram showing a fifth air bag element of the third embodiment of the present invention.

Please refer to FIG. 9. The air bags 51 of the air bag element 50 thereof can also be made into symmetrical C shapes to fit to the size of the saddle 10', preventing the air bags 51 from being displaced to the outer side in case of a small saddle 10' thereof.

Figure 10:
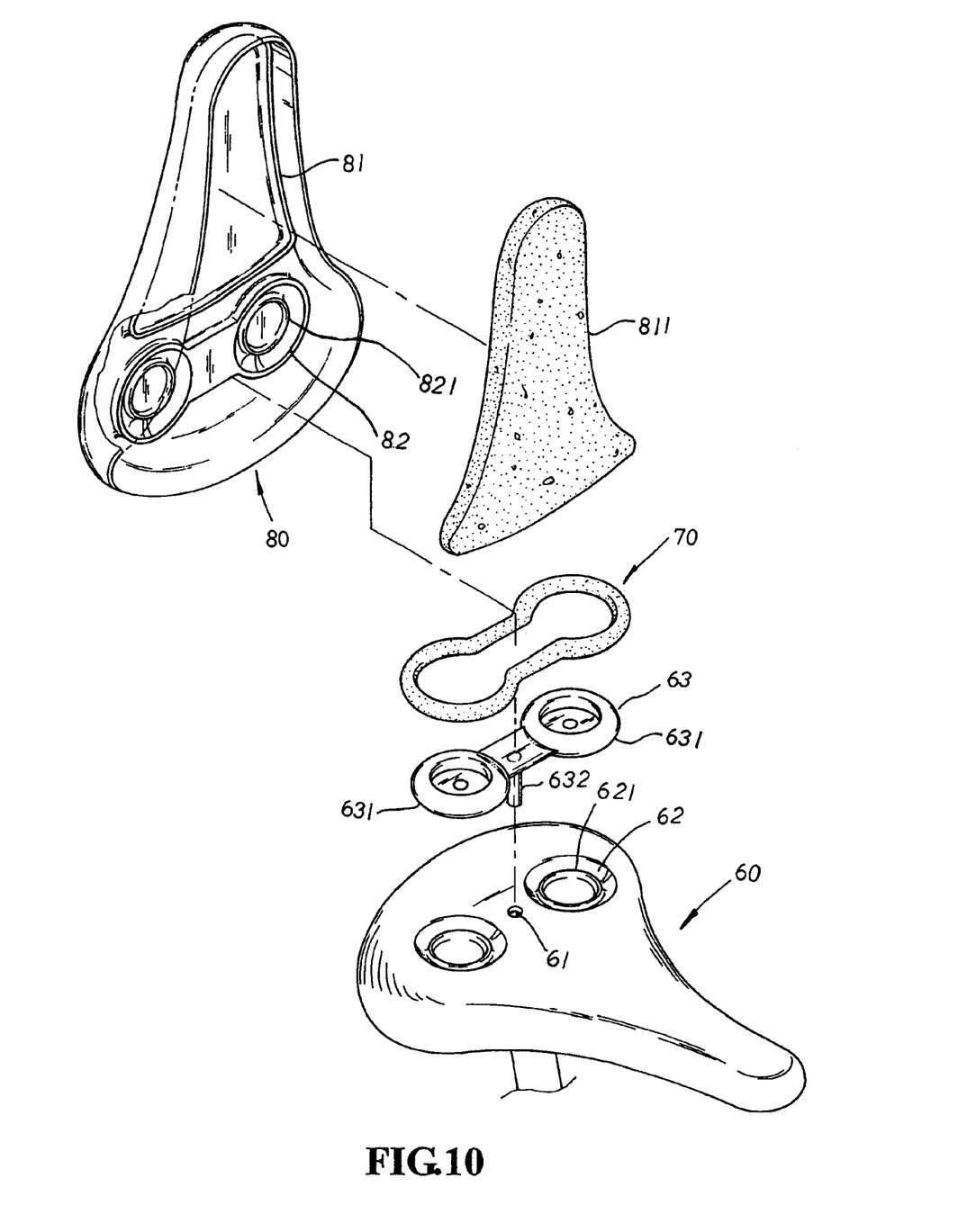
FIG. 10 is a perspective exploded view of a fourth embodiment of the present invention.
Figure 11:
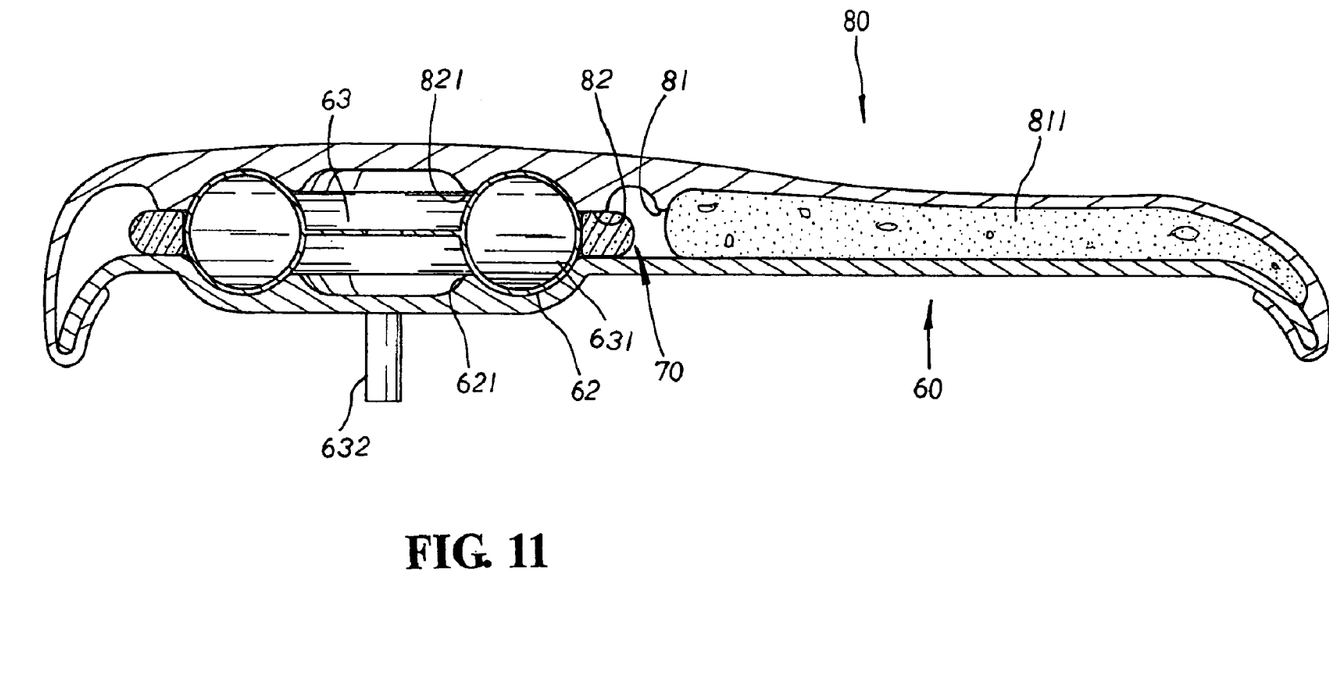
FIG. 11 is a cross sectional view of the fourth embodiment of the present invention in assembly.

Please refer to FIGS. 10 to 11 inclusive. The present invention can also be made up of a saddle 60 and an outer leather layer 80 with an air bag element 63, an elastic support member 70, and a spongy mass 811 housed therebetween. The saddle 60 has a through hole 61 properly preset thereon, a pair of annular retaining cavities 62 of proper depth symmetrically disposed at both sides of the through hole 61 thereof, and a limiting ring rib 621 protruding at the upper surface of each retaining cavity 62 therein to define a space there-between for an air bag 631 disposed at each lateral side of the air bag element 63 thereof to be located therein. An inflation nozzle 632 is extending downwards at the bottom side of the air bag element 63 to be led through the through hole 61 of the saddle 60 thereof. The air bags 631 of the air bag element 63 are protruding at the top of the retaining cavities 62 thereof from the middle section of the upper half thereof, and the elastic support element 70 figured like the air bag element 63 is applied to the middle section of the air bag element 63 and engaged therewith at the outer periphery of the air bag element 63 with the upper section of the air bags 631 thereof protruding upwards at the top thereof. The outer leather layer 80 is made of rubber or plastic materials, having a triangle-like stop rib 81 defining the front side thereon for the spongy mass 811 of the same shape to be retained therein, a pair of sleeve ribs 82 shaped like the outer periphery of the air bag element 63 protruding at the rear side thereon, and an annular locating rib 821 disposed at the inner side of each sleeve rib 82 therein to define a space there-between for the upper section of each air bag 63 to be adapted therein.

Figure 12:
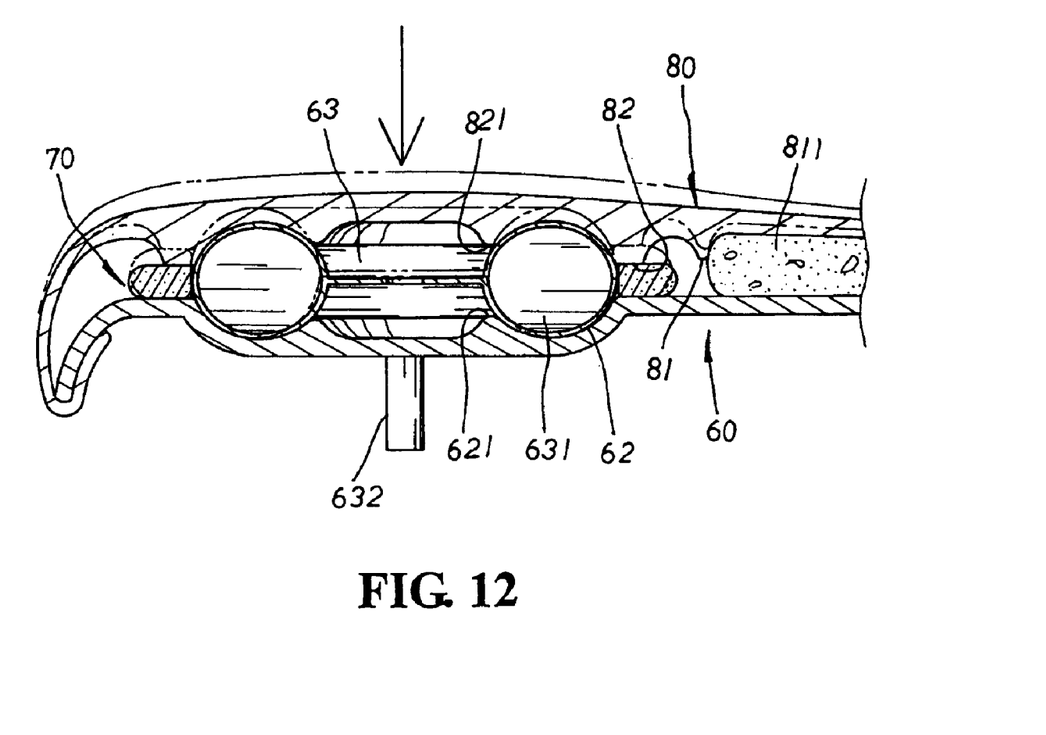
FIG. 12 is a cross sectional view of the fourth embodiment of the present invention in practical use.

Please refer to FIG. 12. In practical use, the saddle 60 sustained via the air bag element 63 and the elastic support member 70 thereof is smoothly dented in a radian relative to that of the hipbones to figure a better suspended elastic arc effect thereof without causing any strains to the rider seated at the saddle 60 thereon, fitting to the ergonomics of human body and maintaining the saddle 60 in proper softness and flexibility with a shock-absorbing effect as well to achieve the best riding condition thereof.

What is claimed is:

1. A saddle structure for a vehicle comprising:
    a) a saddle;
    b) an outer layer connected to the saddle;
    c) a spongy mass located between the saddle and the outer layer; and d) an elastic reinforced area located between the saddle and the outer layer and having:
  i) two annular cavities; and
  ii) a linkage groove communicating with each of the two annular cavities,
    wherein the elastic reinforced area has a hollow interior defined by the two annular cavities and the linkage groove.

2. The saddle structure according to claim 1, wherein the elastic reinforced area is located in the spongy mass adjacent to the outer layer.

3. The saddle structure according to claim 1, wherein the elastic reinforced area is located in the spongy mass adjacent to the saddle.

4. The saddle structure according to claim 1, further comprising an air bag element located in the elastic reinforced area and having:
  a) two air bags; and
  b) an inflation zone located between and communicating with an interior of each of the two air bags, the inflation zone having a pressure control device inserted into a through rod in the saddle.

5. The saddle structure according to claim 4, wherein the elastic reinforced area is located in the spongy mass adjacent to the saddle.

6. The saddle structure according to claim 4, wherein the pressure control device includes an inflation nozzle and an air release nozzle.

7. The saddle structure according to claim 6, further comprising a pneumatic-operated inflation value connected to the inflation nozzle.

8. The saddle structure according to claim 4, further comprising a locating member having:
  a) two wavy adjustment slots; and
  b) a sleeve rod located between the two wavy adjustment slots and inserted into the through rod in the saddle, the sleeve rod having two locating ribs located on an exterior thereof and two connected limiting holes, each of the two locating ribs is inserted into one of two vertical recesses in the through rod in the saddle, and the pressure control device is located in the two limiting holes.

9. The saddle structure according to claim 8, further comprising two adjustment buttons, each of the two air bags includes a linking support facet located at a center thereof and having a linking hole, each of the two adjustment buttons is inserted through the linking hole of one of the two air bags and connected to one of the two wavy adjustment slots.

10. The saddle structure according to claim 4, wherein the pressure control device includes needle inflation valve.

11. The saddle structure according to claim 4, wherein the pressure control device includes an inflation nozzle connected to a sleeve having an air release value.

12. The saddle structure according to claim 4, wherein each of the two air bags has a circular shape.

13. The saddle structure according to claim 4, wherein each of the two air bags has a C-shape.

14. The saddle structure according to claim 4, wherein each of the two air bags is eccentrically shaped.

15. The saddle structure according to claim 4, wherein the elastic reinforced area includes two sleeve ribs and an annular rib located in the outer layer and two retaining cavities located in the saddle, the annular rib surrounding and communicating with each of the two sleeve ribs.

16. The saddle structure according to claim 15, wherein each of the two retaining cavities includes a limiting ring rib.

17. The saddle structure according to claim 15, further comprising an elastic support element located in the annular rib around the air bag element.

18. The saddle structure according to claim 15, further comprising a triangular-shaped stop rib having the spongy mass being inserted in therein.

* * * * *